United States Patent
Nelson

(10) Patent No.: US 9,210,840 B2
(45) Date of Patent: Dec. 15, 2015

(54) BOOM DECK AND REMOVABLE SIDE DECK MOWING TRACTOR DEVICE

(71) Applicant: Matt Nelson, Volga, SD (US)

(72) Inventor: Matt Nelson, Volga, SD (US)

( * ) Notice: Subject to any disclaimer, the term of this patent is extended or adjusted under 35 U.S.C. 154(b) by 79 days.

(21) Appl. No.: 14/180,059

(22) Filed: Feb. 13, 2014

(65) Prior Publication Data

US 2015/0223398 A1    Aug. 13, 2015

(51) Int. Cl.
*A01D 34/63* (2006.01)
*A01D 34/835* (2006.01)
*A01D 34/00* (2006.01)

(52) U.S. Cl.
CPC ............ *A01D 34/835* (2013.01); *A01D 34/001* (2013.01); *A01D 34/006* (2013.01)

(58) Field of Classification Search
CPC ... A01D 34/866; A01D 34/84; A01D 34/863; A01D 43/16; A01D 43/12; A01D 75/30; A01D 34/835; A01D 34/001; A01D 34/006
USPC ............. 56/11.9, 13.7, 14.7, 14.9, 16.9, 15.2; 414/695, 543
See application file for complete search history.

(56) References Cited

U.S. PATENT DOCUMENTS

| | | | |
|---|---|---|---|
| 3,599,406 A | 8/1971 | Akgulian et al. | |
| 4,241,565 A | 12/1980 | Parsons, Jr. | |
| 4,869,056 A * | 9/1989 | Lynch | 56/15.2 |
| 4,887,417 A | 12/1989 | Parsons, Jr. | |
| 4,949,534 A * | 8/1990 | Evans | 56/6 |
| 4,956,965 A | 9/1990 | Parsons, Jr. | |
| 5,210,997 A | 5/1993 | Mountcastle, Jr. | |
| 5,341,629 A * | 8/1994 | Penner | 56/15.2 |
| 5,775,075 A | 7/1998 | Dannar | |
| 6,640,528 B1 | 11/2003 | Rowland | |
| 6,758,031 B2 * | 7/2004 | Franet et al. | 56/14.9 |
| 6,854,250 B2 | 2/2005 | Boyko | |
| 7,175,380 B2 * | 2/2007 | Wilson et al. | 414/695 |
| 7,690,177 B2 * | 4/2010 | Spitzley | 56/14.9 |

FOREIGN PATENT DOCUMENTS

EP    1305993    5/2003
JP    20120706969    4/2012

* cited by examiner

*Primary Examiner* — Robert Pezzuto

(57) ABSTRACT

A boom deck and removable side deck mowing tractor device facilitates efficient conversion between use of the boom deck and the side deck. The device includes a boom arm coupled to and extendable from a tractor. A boom deck is coupled to the boom arm and a first mowing blade is coupled to the boom deck wherein the boom arm, the boom deck, and the first mowing blade define a boom mower. A side deck is removably coupled to a lateral side of the tractor. A second mowing blade is coupled to the side deck wherein the side deck and the second mowing blade define a side mower. A control mechanism is coupled to the tractor and selectively couplable to each of the boom mower and the side mower wherein the control mechanism controls a selectable one of the side mower and the boom mower.

9 Claims, 8 Drawing Sheets

BOOM DECK AND REMOVABLE SIDE DECK MOWING TRACTOR DEVICE

BACKGROUND OF THE DISCLOSURE

Field of the Disclosure

The disclosure relates to tractor devices and more particularly pertains to a new tractor device for providing a tractor having both a boom mowing deck and a removable side mowing deck that facilitates efficient conversion of the tractor for different uses.

SUMMARY OF THE DISCLOSURE

An embodiment of the disclosure meets the needs presented above by generally comprising a tractor and a boom arm coupled to and extendable from the tractor. A boom deck is coupled to a distal end of the boom arm relative to the tractor. A first mowing blade is coupled to the boom deck wherein the boom arm, the boom deck, and the first mowing blade define a boom mower. A side deck is removably coupled to a lateral side of the tractor. A second mowing blade is coupled to the side deck wherein the side deck and the second mowing blade define a side mower. A control mechanism is coupled to the tractor and selectively couplable to each of the boom mower and the side mower wherein the control mechanism controls a selectable one of the side mower and the boom mower.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
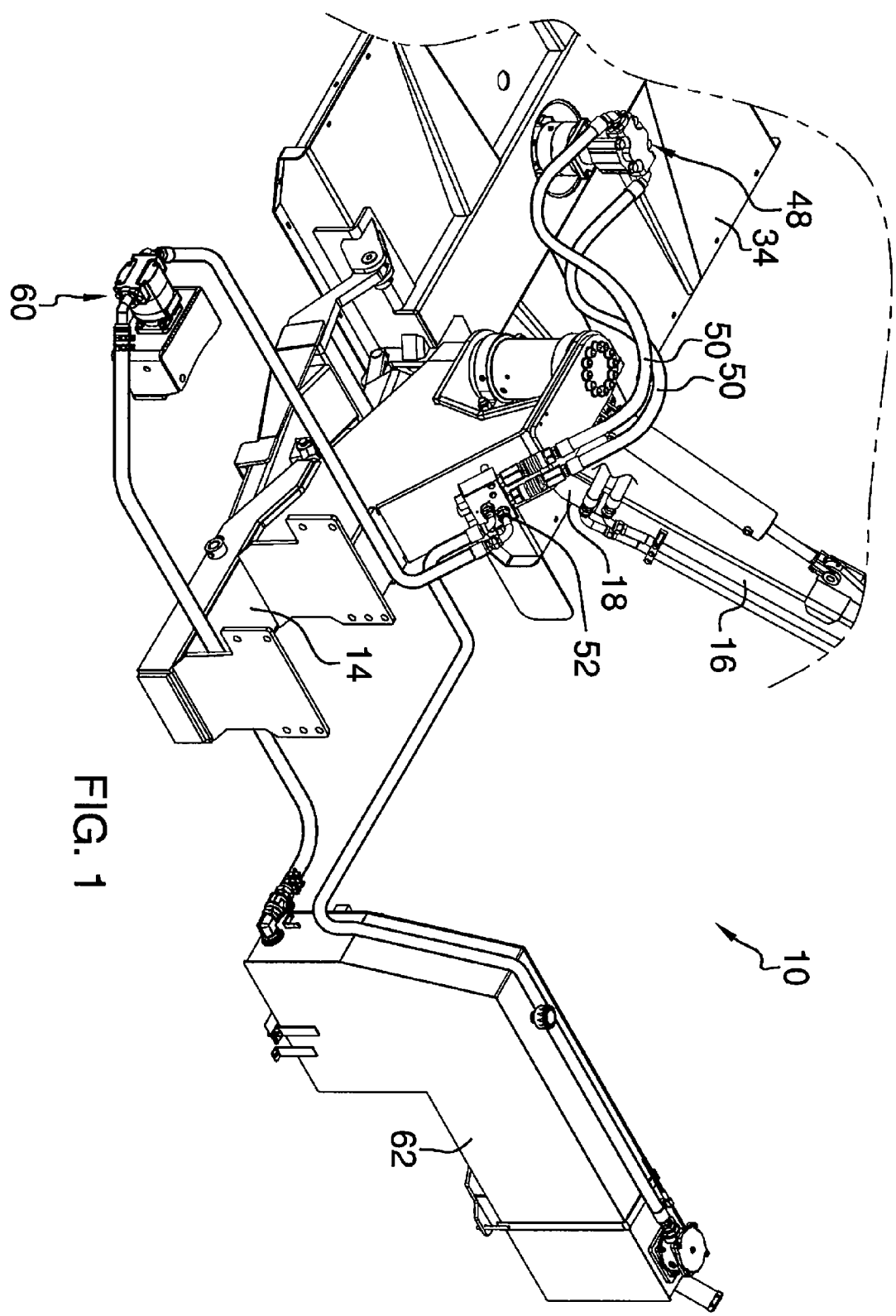
FIG. 1 is a top front side view of a boom deck and removable side deck mowing tractor device according to an embodiment of the disclosure.
Figure 2:
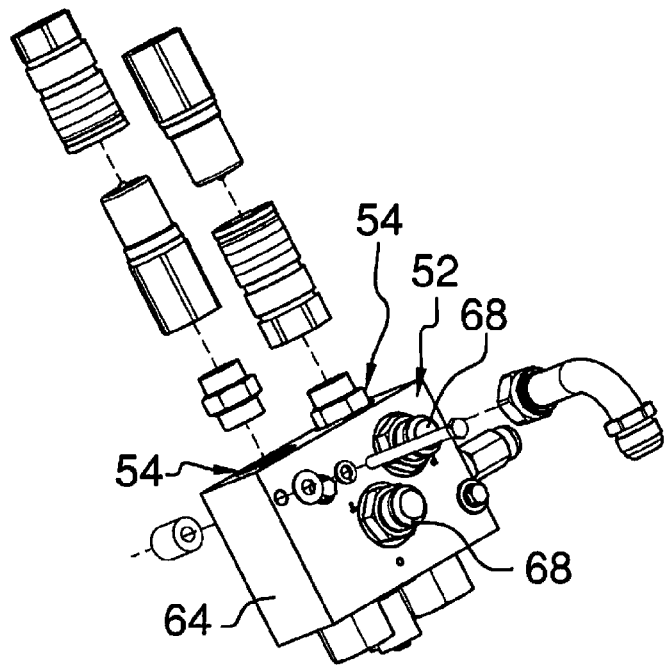
FIG. 2 is a partially exploded detailed top front side view of a control mechanism of an embodiment of the disclosure.
Figure 3:
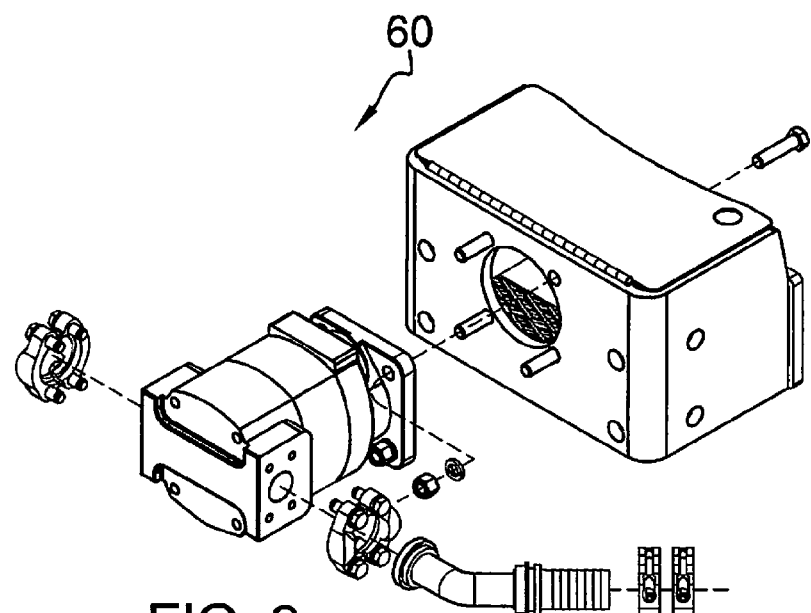
FIG. 3 is a partially exploded detailed top front side view of a pump of a control mechanism of an embodiment of the disclosure.
Figure 4:
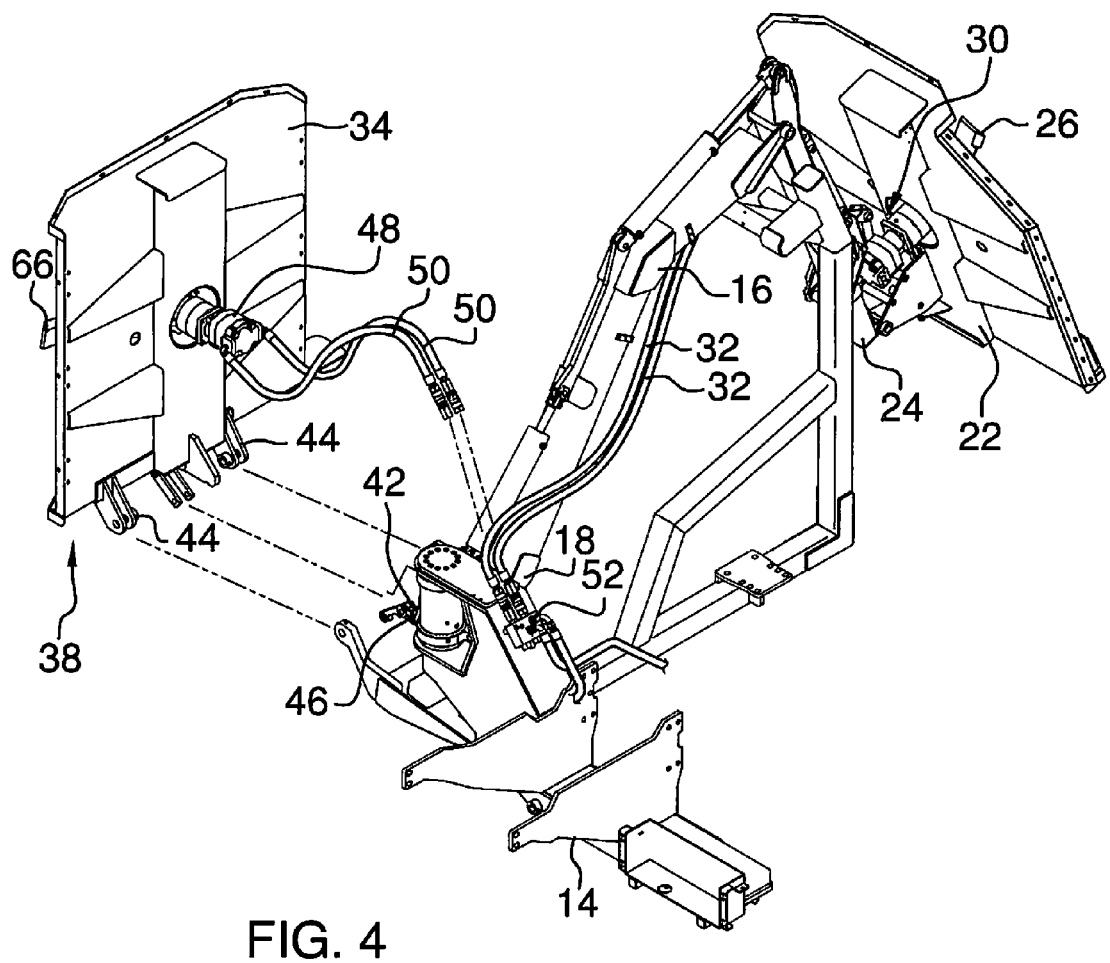
FIG. 4 is a partially exploded top front side view of an embodiment of the disclosure.
Figure 5:
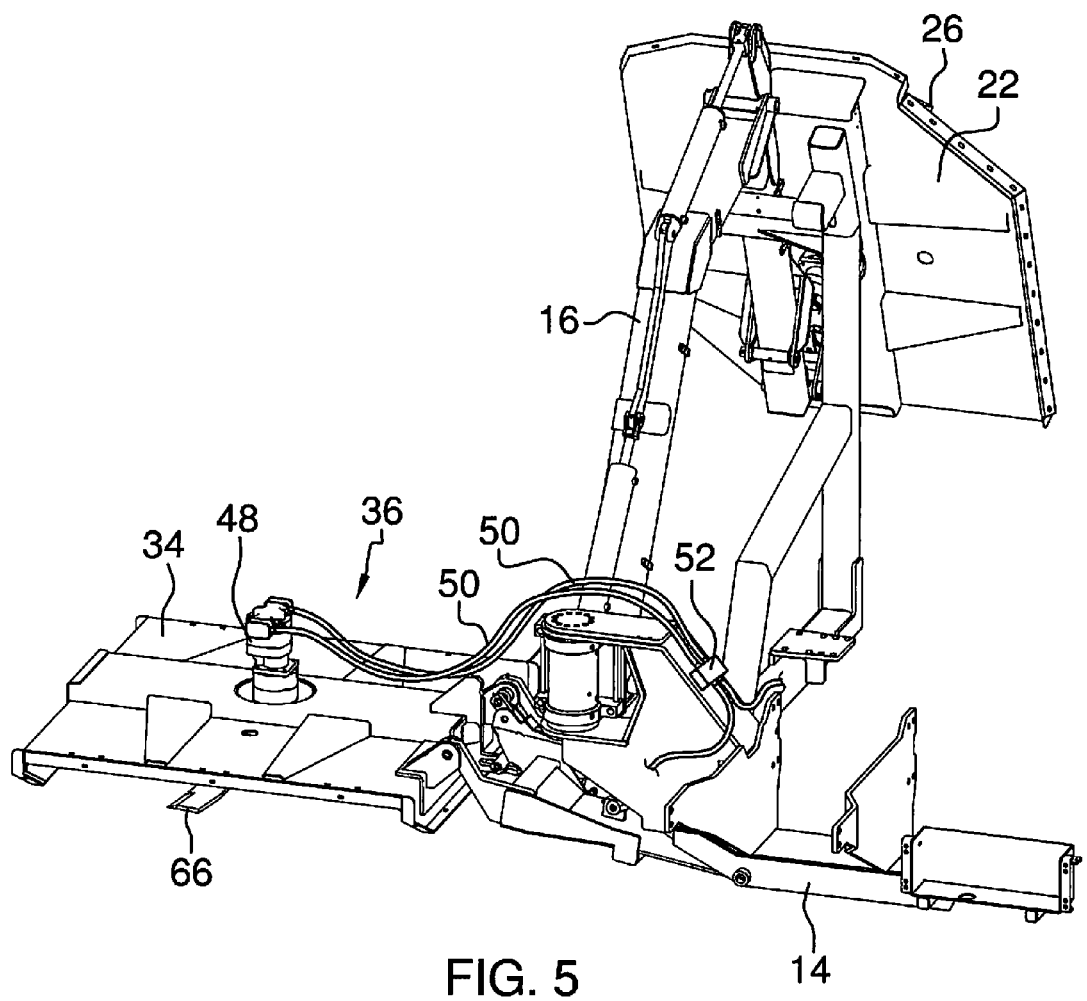
FIG. 5 is a top front side perspective view of an embodiment of the disclosure.
Figure 6:
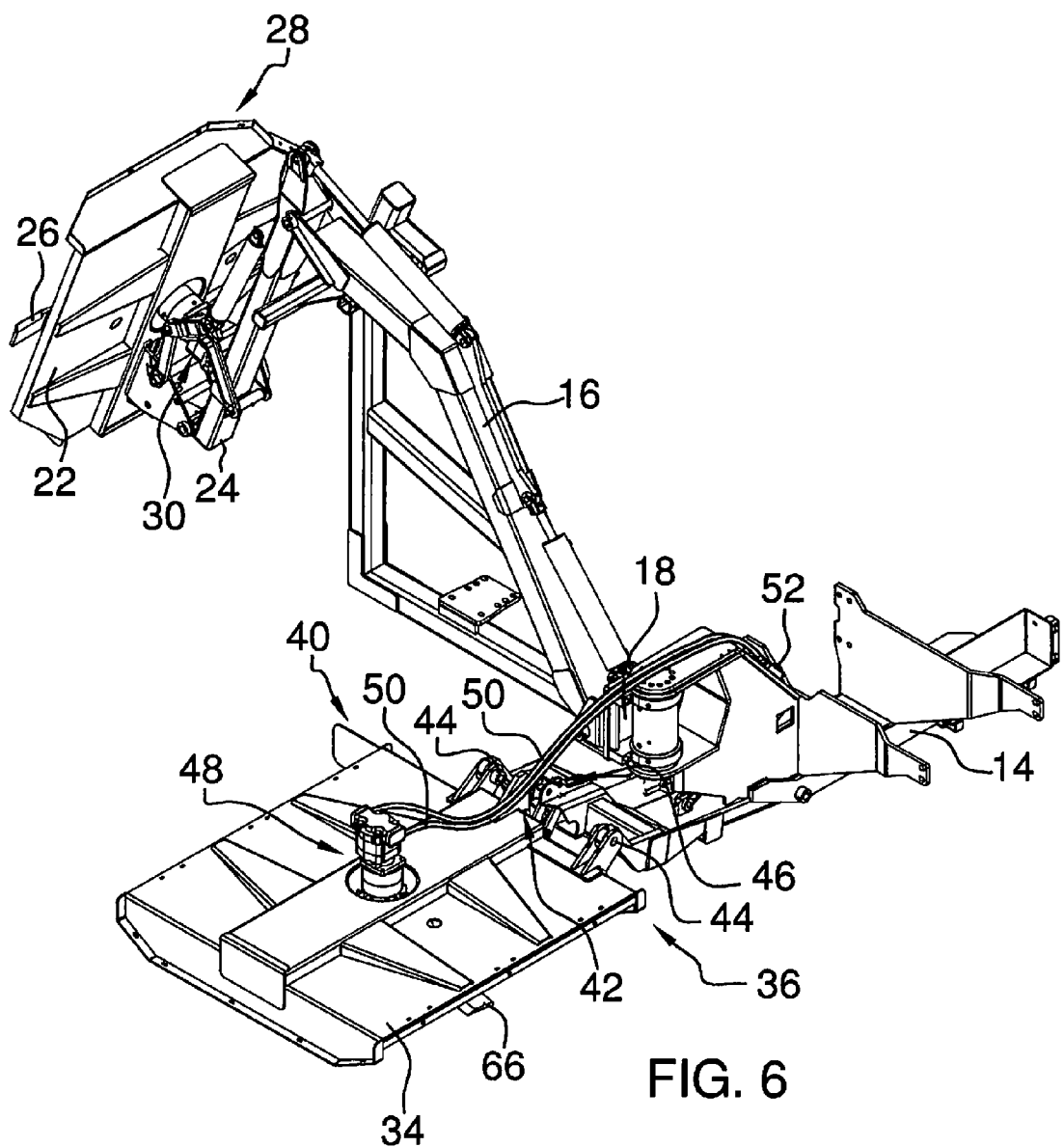
FIG. 6 is a top front side perspective view of an embodiment of the disclosure.
Figure 7:
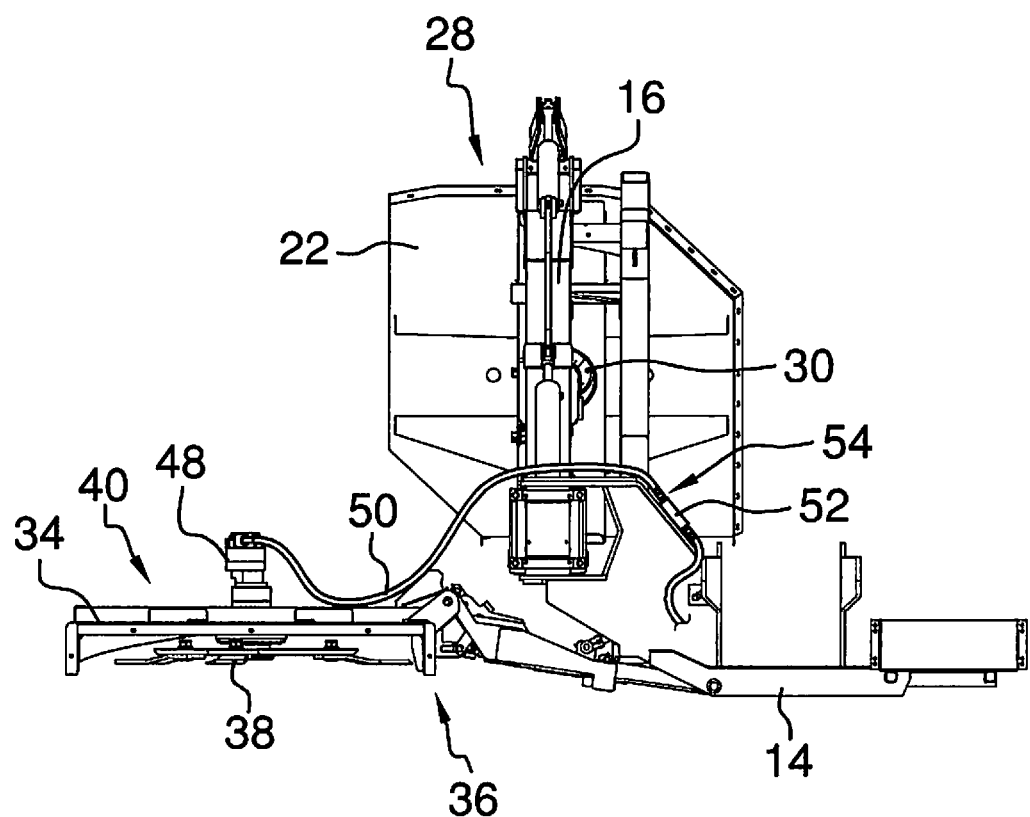
FIG. 7 is a front view of an embodiment of the disclosure.
Figure 8:
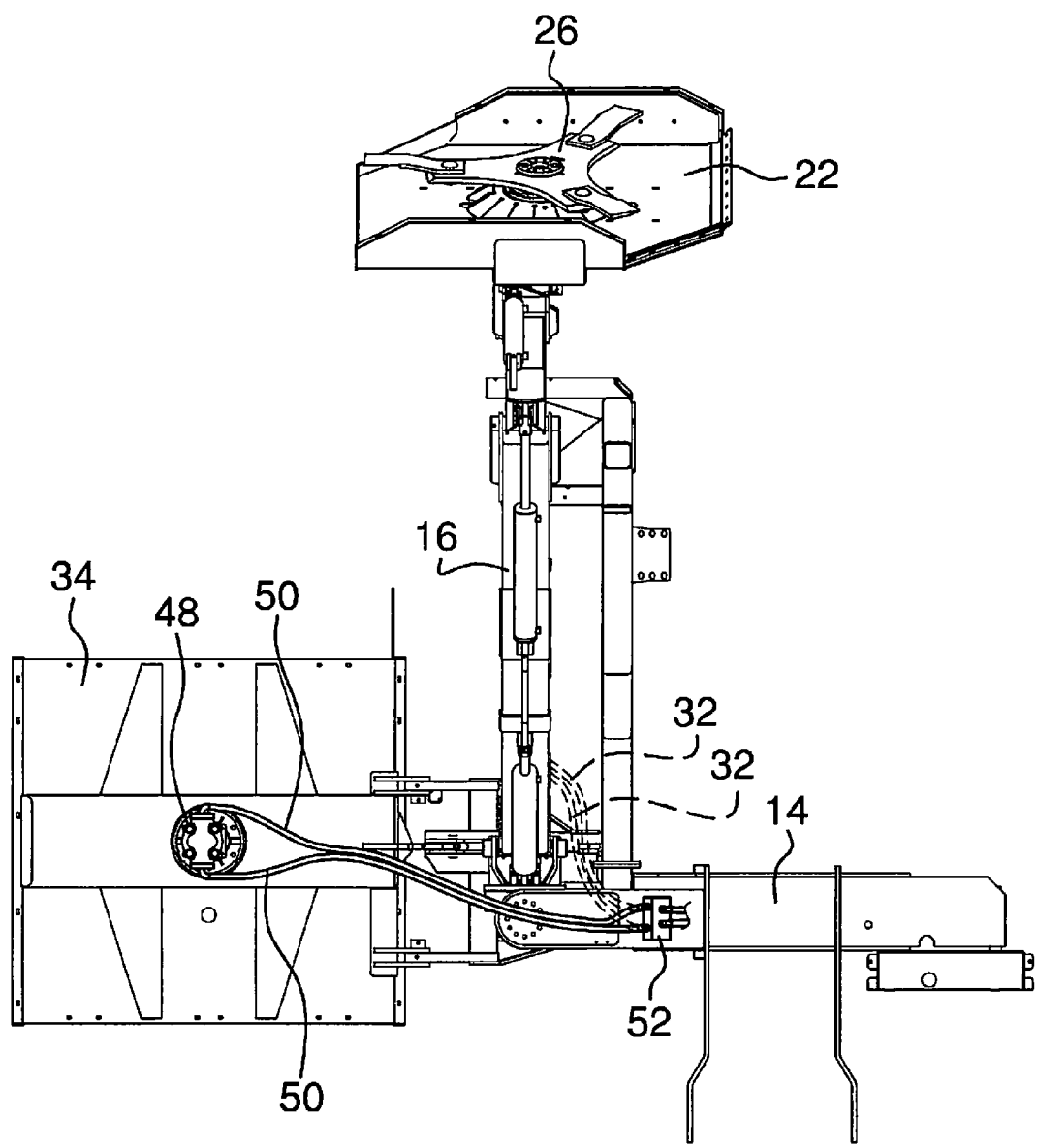
FIG. 8 is a top view of an embodiment of the disclosure.
Figure 9:
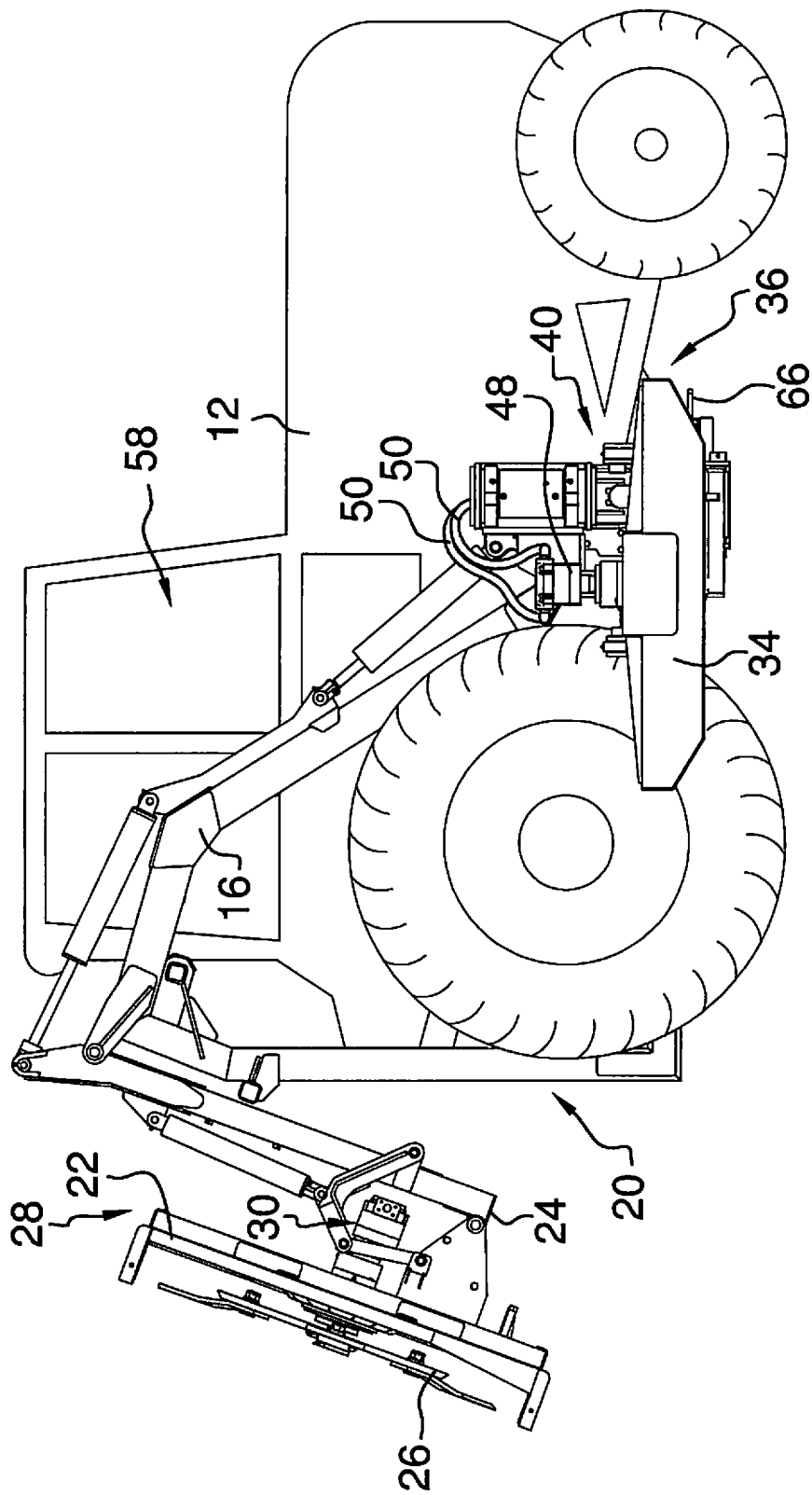
FIG. 9 is a side view of an embodiment of the disclosure in use.

With reference now to the drawings, and in particular to FIGS. 1 through 9 thereof, a new tractor device embodying the principles and concepts of an embodiment of the disclosure and generally designated by the reference numeral 10 will be described.

As best illustrated in FIGS. 1 through 9, the boom deck and removable side deck mowing tractor device 10 generally comprises a tractor 12 of the type conventionally known. Previously, mowing using conventionally known, alternative mowing decks which cannot be used safely simultaneously, has required substantial time to convert between use of the alternative mowing decks. The device 10 includes a mounting bracket 14 coupled to the tractor 12. The mounting bracket 14 is coupled to the tractor 12 in a fixed position relative to the tractor 12. A boom arm 16 is coupled to and extendable from the tractor 12. A proximal end 18 of the boom arm 16 relative to the tractor 12 is coupled to the mounting bracket 14. The mounting bracket 14 is coupled to a rear 20 of the tractor 12 and the boom arm 16 is extendable to the rear 20 of the tractor 12. The proximal end 18 of the boom arm 16 may also be rotatable to pivot the boom arm 16 laterally relative to the tractor 12. A boom deck 22 is coupled to a distal end 24 of the boom arm 16 relative to the tractor 12. The boom deck 22 is mechanically coupled to the boom arm 16 in a conventional manner permitting positioning of the boom deck 24 in a desired orientation relative to the boom arm 16. A first mowing blade 26 is coupled to the boom deck 24 and rotatable wherein the boom arm 16, the boom deck 24, and the first mowing blade 26 define a boom mower 28. A boom hydraulic assembly 30 is coupled to the boom mower 28 for conventional operation of the boom arm 16 and the boom deck 24 to position the boom arm 16 and the boom deck 24 in a desired position relative to the tractor 12. The boom hydraulic assembly 30 may further be utilized in a conventional manner to control the first mowing blade 26. The boom hydraulic assembly 30 comprises a pair of boom hoses 32 used to connect the boom hydraulic assembly 30 to a hydraulic control to operate the boom hydraulic assembly 30.

A side deck 34 is removably coupled to the tractor 12. The side deck 34 may be pivotally and removably coupled to the mounting bracket 14 such that the side deck 34 extends laterally from the tractor 12. The side deck 34 is pivotable between an extended position 36 and a retracted position 38 relative to the tractor 12. A second mowing blade 66 is rotatably coupled to the side deck 34 wherein the side deck 34 and the second mowing blade 66 define a side mower 40. The side mower 40 is pivotable relative to the tractor 12 utilizing a drive arm 42. The side mower 40 is removable from the mounting bracket 14 by removal of a pivot pin 44 and disconnection of the drive arm 42. Typically, a distal end 46 of the drive arm 42 relative to the side deck 24 is disconnected from the tractor 12. A side hydraulic assembly 48 is coupled to the side deck 24 and is operationally coupled to the drive arm 42 coupled to the side deck 24 to pivot the side deck 24 relative to the tractor 12. The side hydraulic assembly 48 may also be conventionally coupled to control rotation and positioning of the second mowing blade 66. The side hydraulic assembly 48 comprises a pair of side hoses 50 used to connect the side hydraulic assembly 48 to a hydraulic control to operate the side hydraulic assembly 48. Each of the boom hoses 32 and the side hoses 50 may comprise a quick connect coupler of conventional design.

A control mechanism 52 is coupled to the tractor 12 and may be coupled to the mounting bracket 14 to be accessible while converting between use of the boom mower 28 and the side mower 40 such that only one of which is operational at a time. The control mechanism 52 is hydraulic and may incorporate a pump 60 and a fluid reservoir 62 which may each be fluidly coupled to a main control housing 64 coupled to the mounting bracket 14. The pump 60 and the fluid reservoir 62 may be coupled to the tractor 12 remotely from the mounting bracket 14 and the main control housing 64. The control mechanism is selectively couplable to each of the boom mower 28 and the side mower 40 wherein the control mechanism 52 controls a single, selectable one of the side mower 28 or the boom mower 40. The control mechanism 52 includes a pair of fluid ports 54 and is couplable to a selectable one of the boom hydraulic assembly 30, by coupling the boom hoses 32 to the fluid ports 54, and the side hydraulic assembly 48, by coupling the side hoses 50 to the fluid ports 54. Each of the boom hoses 32 is selectively couplable to an associated one of the fluid ports 54 such that the boom hydraulic assembly 30 is operable by the control mechanism 52 when the boom hoses 32 are coupled to the fluid ports 54. Each of the side hoses 50 is selectively couplable to an associated one of the fluid ports 54 such that the side hydraulic assembly 48 is operable by the control mechanism 52 when the side hoses 52 are coupled to the fluid ports 54. Thus, the control mechanism 52 is configured to control singularly either the boom mower 28 or the side mower 40 including extension and retraction of the side deck 24 relative to the tractor 12 when the control mechanism 52 is operationally coupled to the side mower 40. Operational controls 68 for the control mechanism 52 may be positioned on the main control housing 64 on the mounting bracket 14 or positioned in a cab 58 of the tractor 12.

In use, the weight of the side mower 40 when attached to the tractor 12 dictates removal of the side mower 40 from the tractor 12 when using the boom mower 28. Removal of the side mower 40 is facilitated by a simplified connection to the tractor 12 requiring disconnection of the drive arm 42 and detachment of the side deck 24. The boom mower 28 may be retracted or otherwise secured behind the tractor 12 allowing for relatively permanent fixation of the boom mower 28 to the tractor 12 and use of the side mower 40 without having to remove the boom mower 28 from the tractor 12. The control mechanism 52 is universal to run either the boom hydraulic assembly 30 or the side hydraulic assembly 48. The control mechanism 52 is attached to a selectable one of the boom hydraulic assembly 30 and the side hydraulic assembly 48 using the boom hoses 32 and the side hoses 50, respectively.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A boom deck and removable side deck mowing tractor device comprising:
   a tractor;
   a boom arm coupled to and extendable from said tractor;
   a boom deck coupled to a distal end of said boom arm relative to said tractor;
   a first mowing blade coupled to said boom deck wherein said boom arm, said boom deck, and said first mowing blade define a boom mower;
   a side deck removably coupled to a lateral side of said tractor;
   a second mowing blade coupled to said side deck wherein said side deck and said second mowing blade define a side mower;
   a mounting bracket coupled to said tractor, a proximal end of said boom arm relative to said tractor being coupled to said mounting bracket, said side mower being removably coupled to said mounting bracket; and
   a control mechanism coupled to said tractor, said control mechanism being selectively couplable to each of said boom mower and said side mower wherein said control mechanism controls a selectable one of said side mower and said boom mower, said control mechanism being coupled to said mounting bracket.

2. The device of claim 1, further comprising said control mechanism being hydraulic.

3. The device of claim 2, further comprising:
   a boom hydraulic assembly coupled to said boom mower, said boom hydraulic assembly being operationally coupled to said boom arm and said boom deck to position said boom arm and said boom deck in a desired position relative to said tractor;
   a side hydraulic assembly coupled to said side deck, said side hydraulic assembly being operationally coupled to a drive arm coupled to said side deck to pivot said side deck relative to said tractor; and
   said control mechanism being couplable to a selectable one of said boom hydraulic assembly and said side hydraulic assembly.

4. The device of claim 1, further comprising said side deck being pivotally coupled to said tractor wherein said side deck is pivotable between an extended position and a retracted position relative to said tractor.

5. The device of claim 4, further comprising said control mechanism controlling extension and retraction of said side deck relative to said tractor when said control mechanism is operationally coupled to said side mower.

6. The device of claim 1, further comprising said mounting bracket being coupled to said tractor in a fixed position and said side mower being pivotable relative to said mounting bracket wherein said side mower is pivotable relative to said tractor.

7. The device of claim 3, further comprising said control assembly controlling positioning of said boom arm relative to said tractor when said control mechanism is coupled to said boom hydraulic assembly.

8. A boom deck and removable side deck mowing tractor device comprising:
   a tractor;
   a boom arm coupled to and extendable from said tractor;
   a boom deck coupled to a distal end of said boom arm relative to said tractor;

a first mowing blade coupled to said boom deck wherein said boom arm, said boom deck, and said first mowing blade define a boom mower;

a side deck removably coupled to a lateral side of said tractor;

a second mowing blade coupled to said side deck wherein said side deck and said second mowing blade define a side mower; and a control mechanism coupled to said tractor, said control mechanism being selectively couplable to each of said boom mower and said side mower wherein said control mechanism controls a selectable one of said side mower and said boom mower, said control mechanism being hydraulic;

a boom hydraulic assembly coupled to said boom mower, said boom hydraulic assembly being operationally coupled to said boom arm and said boom deck to position said boom arm and said boom deck in a desired position relative to said tractor;

a side hydraulic assembly coupled to said side deck, said side hydraulic assembly being operationally coupled to a drive arm coupled to said side deck to pivot said side deck relative to said tractor;

said control mechanism being couplable to a selectable one of said boom hydraulic assembly and said side hydraulic assembly;

said control mechanism comprising a pair of fluid ports;

said boom hydraulic assembly comprising a pair of boom hoses, each of said boom hoses being selectively couplable to an associated one of said fluid ports such that said boom hydraulic assembly is operable by said control mechanism when said boom hoses are coupled to said fluid ports; and said side hydraulic assembly comprising a pair of side hoses, each of said side hoses being selectively couplable to an associated one of said fluid ports such that said side hydraulic assembly is operable by said control mechanism when said side hoses are coupled to said fluid ports.

9. A boom deck and removable side deck mowing tractor device comprising:

a tractor;

a mounting bracket coupled to said tractor, said mounting bracket being coupled to said tractor in a fixed position;

a boom arm coupled to and extendable from said tractor, a proximal end of said boom arm relative to said tractor being coupled to said mounting bracket;

a boom deck coupled to a distal end of said boom arm relative to said tractor;

a first mowing blade coupled to said boom deck wherein said boom arm, said boom deck, and said first mowing blade define a boom mower;

a boom hydraulic assembly coupled to said boom mower, said boom hydraulic assembly being operationally coupled to said boom arm and said boom deck to position said boom arm and said boom deck in a desired position relative to said tractor, said boom hydraulic assembly comprising a pair of boom hoses;

a side deck removably coupled to a lateral side of said tractor, said side deck being pivotally coupled to said tractor wherein said side deck is pivotable between an extended position and a retracted position relative to said tractor;

a second mowing blade coupled to said side deck wherein said side deck and said second mowing blade define a side mower, said side mower being pivotable relative to said mounting bracket wherein said side mower is pivotable relative to said tractor, said side mower being removably coupled to said mounting bracket;

a side hydraulic assembly coupled to said side deck, said side hydraulic assembly being operationally coupled to a drive arm coupled to said side deck to pivot said side deck relative to said tractor, said side hydraulic assembly comprising a pair of side hoses; and a control mechanism coupled to said mounting bracket wherein said control mechanism is coupled to said tractor, said control mechanism being selectively couplable to each of said boom mower and said side mower wherein said control mechanism controls a selectable one of said side mower and said boom mower, said control mechanism being hydraulic, said control mechanism being couplable to a selectable one of said boom hydraulic assembly and said side hydraulic assembly, said control mechanism comprising a pair of fluid ports, said control mechanism controlling extension and retraction of said side deck relative to said tractor when said control mechanism is operationally coupled to said side mower, each of said boom hoses being selectively couplable to an associated one of said fluid ports such that said boom hydraulic assembly is operable by said control mechanism when said boom hoses are coupled to said fluid ports, each of said side hoses being selectively couplable to an associated one of said fluid ports such that said side hydraulic assembly is operable by said control mechanism when said side hoses are coupled to said fluid ports.

\* \* \* \* \*